March 29, 1966 K. F. SINCLAIR 3,243,589
BACKSCATTER FLAW DETECTION SYSTEM
Filed July 9, 1963 4 Sheets-Sheet 1

INVENTOR.
KENNETH F. SINCLAIR
BY
ATTORNEYS

INVENTOR.
KENNETH F. SINCLAIR

BY
ATTORNEYS

FIG. 6

United States Patent Office 3,243,589
Patented Mar. 29, 1966

3,243,589
BACKSCATTER FLAW DETECTION SYSTEM
Kenneth F. Sinclair, Daly City, Calif., assignor to United States of America as represented by the Secretary of the Navy
Filed July 9, 1963, Ser. No. 293,912
5 Claims. (Cl. 250—71.5)

The invention described herein may be manufactured and used by or for the Government of the United States of America for governmental purposes without the payment of any royalties thereon or therefor.

This application is a continuation-in-part of application Serial No. 253,009, filed January 21, 1963, now Patent No. 3,197,638, and entitled "Backscatter Flaw Detection System."

The present invention relates to non-destructive testing for material flaws and, more particularly, to such testing which requires access to only one side of the test object and which employs backscatter radiation resulting from radiation-induced Compton interactions in the test medium.

The conventionally accepted method for detecting material flaws is by means of film radiography. This method requires access to both sides of the test object since the X-ray machine has to be placed on one side of the specimen and the film, to record the image, on the opposite side. The resultant films, which will indicate flaws in the examined portion of the specimen, then have to be processed before decisions can be made regarding the section of material examined. In addition, cumbersome and heavy equipment has to be moved repeatedly to examine large objects, resulting in a large number of films at considerable expense in time and cost. In many cases existing radiographic technique cannot be used. In case of closed vessels, for example, access to both sides of the material is not always available, thus precluding use of this method.

The shortcomings of the conventional film radiography method for detecting flaws in materials have given impetus to the need for development of a practicable dynamic radiological testing method which will effectuate rapid and non-destructive testing for these material flaws. Two basic approaches suggest themselves which relate to the use of X- or gamma radiation coupled with scintillation detection. The one approach employs the "transmission" technique and the other employs the "back-scatter" technique. Both techniques involve subjecting the under-examination portion of the material specimen to controlled incident radiation and then, by the use of scintillation detection, observing the characteristics of radiation emerging from the irradiated portion of the material specimen. In both instances variations in the number of emerging radiation photons detected per unit time which are not attributable to known dimensional changes in the test medium are indicative of anomalies, i.e., flaws, in the material specimen under test. In the transmission technique the flaw-indicating information is contained in the unscattered beam of gamma photons which have traversed the test medium. In the backscatter technique this flaw-indicating information is carried by degraded backscattered photons which emerge from the material specimen in a direction generally back toward the source of the incident radiation and which are produced as a result of Compton interactions in the test medium induced by the incident radiation. During inspection with either technique the material being tested can be kept in continuous motion or can be stepped in some systematic way to provide the coverage desired by the testing apparatus.

The "backscatter" technique of testing offers one cardinal advantage over the "transmission" technique in that, in this backscatter technique, all of the testing apparatus, including both the radioactive source of the radiation used for irradiating the material being tested and the detection equipment employed to examine the resultant radiation emerging from the tested material, can be located on the same side of the tested material, that is, access is needed only to one side of the material under test. An illustrative example of a situation where the requirement of a single-side-only access meets practical needs is in the examination of long welds or welds on a closed vessel where both-side access is either impossible or extremely difficult.

Though the backscatter process has been in practical use for measuring the thickness of sheet materials, it has not previously been developed as a satisfactory technique for flaw detection. Failure to provide uniform sensitivity along with adequate resolution has thus far prevented practical flaw detection by use of this backscatter technique. The present invention solves this problem and produces a backscatter flaw detection system which provides both uniform sensitivity and adequate resolution.

The lack of uniform sensitivity, which has been the principal failure preventing prior backscatter flaw detection processes, arises from a physical limitation inherent in the backscattering process. In the backscattering process the primary and scattered photons are attenuated exponentially as a function of depth in the material (under test) while the scattering coefficient at any point in the material remains constant for fixed geometry, with the result that the sensitivity of a flaw detecting method employing "backscattering" deteriorates markedly with material sample thickness.

Applicant, in his application Serial No. 253,009 entitled "Back-scatter Flaw Detection System" (referred to supra), solved the problem of providing "uniform sensitivity" in a backscatter flaw detection system principally by the use of a special collimator which functions in such a way that that operative area of the detector which senses and registers the backscattered radiation emerging from the test object increases with increase in depth in the test object of the location therein of the point under test examination (i.e., "point of interest") at any given time, in such a manner that the intrinsic loss in testing sensitivity with increase in depth in the test object of the point-under-examination is offset by the increase in operative radiation registering area of the backscatter radiation sensing detector.

In the present invention applicant provides a different mode for achieving, in the backscatter flaw detection system, "uniform testing sensitivity" for the various depth locations, in the test medium, of the points of examination ("points of interest"). Applicant's previously-disclosed method for achieving this "uniform sensitivity" (parent application Serial No. 253,009 "Back-scatter Flaw Detection Apparatus," referred to supra) was keyed to the use of "conical-passageway" collimator. Here the technique for achieving this "uniform sensitivity" relies upon the use of a so-called "depth compensator" rather than the "conical-passageway collimator" employed in applicant's parent application cited above. Whereas the "conical-passageway" collimator compensatingly shifted the size of the operative backscattered-photon-registering detector area as a way of compensating for the inherent loss in sensitivity as a function of depth in the test material of the "point-of-examination" ("point-of-interest"), the presently-defined "depth compensator" acts as a variable "radiation absorber" between the irradiated material test specimen and the detector which registers the operative flaw-intelligence-bearing backscattered photons emerging from this irradiated material test specimen. This variable "radiation absorber" represented by the so-called "depth compensator" acts in such a fashion that it subjects the flaw-information-bearing backscattered photons emerging from the material test specimen to a varying amount of absorptive attenuation which varies inversely with the depth in the test object of the "point of examination." In this way, the "depth compensator" makes it appear to the backscattered-photon-registering detector that all of the backscattered photons-of-interest, regardless of the depth of their origin in the test specimen material are arriving at the detector through substantially the same total thickness of attenuating radiation-absorptive material, including the test specimen material itself. It is the "uncorrected" radiation attenuation attributable to the material test specimen and which varies as a function of depth of the point of examination therein which brings the variation-of-sensitivity problem into the basic backscatter flaw detection technique; with the "depth compensator" compensating for this variable attenuation in the material test specimen as described, the present system achieves its "uniform sensitivity."

In several ways the present "depth compensator" represents a significant improvement over the "conical-passageway" collimator of the parent application. The "depth compensator" herein, as represented by its several defined embodiments, is substantially simpler in its structure than the "conical-passageway" collimator, permitting significant saving in design and fabrication costs over the earlier-developed "conical-passageway" collimator. The present "depth compensator" also permits the photon-registering detector to be located considerably closer to the test object than can be accomplished with a system employing the "conical-passageway" collimator with the result that the sensitivity of the system is increased, or looked at in another way, permitting a significant reduction in the size of the radioisotope source needed for a given level of performance. This afforded reduction in the size of the radioactive source will yield a great saving in the weight of the shielding required and in the overall size of the total equipment employed in the flaw detection system.

Among the objects of importance of the present invention are:

To provide a practical "backscatter" flaw detection system.

To provide a "backscatter" flaw detection system which achieves uniform detection sensitivity for all flaw depth locations in the material under test.

To provide a "backscatter" flaw detection system characterized by practically adequate flaw resolution and uniform detection sensitivity for all flaw depth locations in the material under test.

To provide a practical "backscatter" flaw detection system of improved sensitivity.

To provide, for use in a "backscatter" flaw detection system, an improved sensitivity corrector for automatically compensating for the change in sensitivity (in a "backscatter system") due to a change in depth, in the test object, of the point-of-examination.

Other objects and many of the attendant advantages of this invention will be readily appreciated as the same becomes better understood by reference to the following detailed description when considered in conjunction with the accompanying drawing in which.

Any "backscatter" technique hinges basically upon what has become known as the Compton effect. Compton found that, by directing radiation of high frequency against material containing free electrons, collisions occurred between incident radiation photons and electrons in the material which manifested results similar to those produced by the collison between two perfectly elastic spheres. As a result of such collison a colliding photon is deflected from its original path and loses energy (is "degraded") and the electron colliding therewith is caused to recoil. It was found that there was a direct relationship between the degree of deflection of the incident photon and the loss of energy in the rebounding (deflected) photon. Some of the rebounding photons resulting from Compton interactions (between the irradiated material atoms and the incident radiation) will have such an angle of deflection (scattering) as to "bounce" back in the general direction of the incident photon beam. These will be "backscattered photons" which are employed in the backscatter technique used herein.

The flaw detection system defined herein achieves the high degree of sensitivity and of resolution, which are requisites of a practicable backscatter flaw detection system, by the use of a predetermined "best scattering geometry" which, in effect, entails the use of a discriminating geometry-energy relationship interrelating the "directional" radiation source (which is of a given radiation energy level and which directs selectively-directional radiation incident upon the test specimen), the nature of the material specimen under test and a selectively-discriminating detection of the backscattered photons emerging from the irradiated test specimen. This use of a "best scattering geometry" in the flaw detection system herein is grounded upon the known geometry-energy probability relationships associated with Compton interactions and has, for its objective, the detection by the system apparatus of the maximum possible number (highest scattered intensity) of the significant backscattered photons which carry the flaw-indicating information about that portion of the material specimen under test.

The formulation of a "best scattering geometry" entails an analytical consideration of the phenomena associated with Compton interactions and, as developed herein, a major simplification of the actual backscattering phenomena associated with Compton interactions.

Compton interactions, as induced in material by the use of incident radiation as employed in the technique of this invention, produce both singly and multiply scattered photons. A general solution for a "best scattering geometry" which would entail consideration of both singly and multiply scattered photons would be extremely difficult, requiring use of Monte Carlo techniques and machine computation. It has been found that, by confining the flaw detection system defined herein to a consideration of only singly scattered photons, with good source and detector "collimation," the necessary flaw-indicating information would be conveyed by the singly-scattered backscattered photons and that a precise "best scattering geometry" could be utilized with the flaw detection system confining itself to consideration of only singly-scattered backscattered photons.

Fundamental to any relationship involving Compton interactions, such as, for example, the "best scattering geometry" employed herein, is an understanding of the quantitative aspects of what is known as the "Compton effect." In the Compton effect, which involves the elastic scattering of photons by electrons (see supra), there is an established relationship between the energy level of the incident radiation (inducing the Compton interaction), the energy level of the scattered (emerging) photon and the angle of scattering defined by the relative directions of the incident radiation photon (initiating the interaction event) and of the scattered photon resulting therefrom. This energy-direction relationship is defined by what is known as the Compton scattering equation which may be expressed as follows:

$$E_2 \frac{E_1}{1 + \frac{E_1}{mc^2}(1 - \cos \theta)} \quad \text{(Equation 1)}$$

where:

$E_1$ is the incident radiation beam energy;
$E_2$ is the scattered beam energy;
$\theta$ is the angle of scattering; and
$mc^2$ is the rest energy of the colliding electron and is equal to 0.511 mev.

Figure 7:
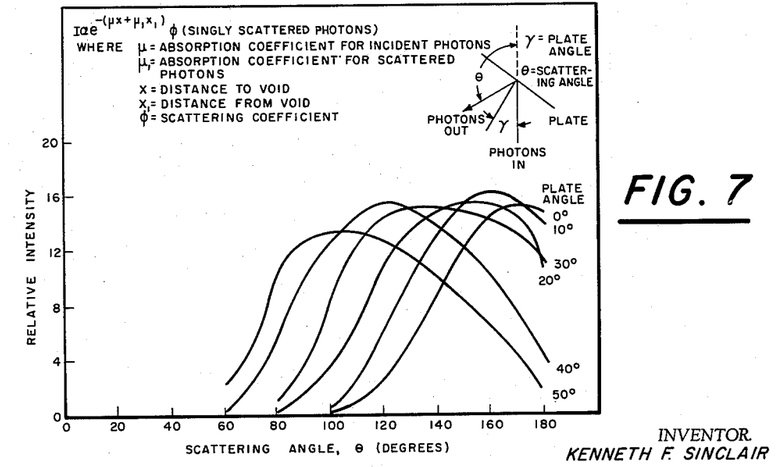
FIG. 7 portrays the relationship between the relative intensities of singly-scattered backscattered photons and scattering angles ($\theta$) for various plate angles $\gamma$.

Note that the upper right-hand portion of the graph of FIG. 7 portrays scattering angle $\theta$ (as noted above), as well as plate angle $\gamma$ which relates the direction of the incident radiation to the normal line drawn to the radiation-incident surface of the test specimen). Employment of the principle expressed by this Compton scattering equation by a backscatter flaw detection system affords a way of selectively discriminating in the detection of backscattered photons emerging from a radiated test specimen in such a way as to give meaningful information regarding possible flaw presence in said test specimen. For example, with the use of a "collimated" radiation source of a known energy level to deliver an incident radiation beam to the test specimen at a predetermined angle with respect thereto and the use of a "selectively-registering" detector (which registers only photons of a certain predetermined energy level or range of energy levels), the location of the origin of these backscattered photons of the energy level(s) of interest can be determined to show the location within the test specimen of flaws whose presence will be indicated by variation in response of this "selectively-registering" (discriminating) photon detector. The specific manner in which the principle stated in the Compton scattering equation is employed for flaw-information-yielding discrimination herein will be developed infra when it will be related to the specific structure set forth below.

In addition to the principle expressed in the Compton scattering equation, there is another set of principles operatively embraced by the "best scattering geometry" concept employed in the flaw detection system of this invention. In order to produce the degree of sensitivity and resolution achieved herein and necessary to a practicable backscatter flaw detection system, the flaw detection system herein is predicated, in part, upon the reception by its backscatter-photon-registering detector of a maximum number (i.e., maximum relative backscattered intensity) of the backscattered "photons-of-interest." When radiation incident upon a material specimen produces, by Compton interaction, backscattered photons (which emerge from the material specimen), both the incident radiation and the resulting emerging (backscattered) photons undergo a reduction in intensity due to attenuation processes suffered while traversing the specimen material. The "relative scattered intensity" (i.e., relative intensity of the singly-scattered backscattered photons) which will emerge from a given material specimen to register on a suitable detector for sensing these emerging backscattered photons can be expressed by the equation $$I = k e^{-(\mu x + \mu_1 x_1)} \phi \quad \text{(Equation 2)}$$

$I$ = the relative scattered intensity (photons/gm./steradian);
$k$ = a constant;
$e$ = the natural logarithm base;
$\mu$ = the absorption coefficient in the test material for the incident radiation flux (cm.$^{-1}$);
$\mu_1$ = the absorption coefficient in the test material for the scattered (exit) radiation flux (cm.$^{-1}$);
$x$ = the distance in the test material from the radiation-incident surface thereof to the "point-of-interest" or "point-of-examination" (i.e., scattering point from which backscatter photons originate) (cm.);
$X_1$ = the distance in the test material from the "point-of-interest" ("point-of-examination") to the exterior face of the material (cm.); and
$\phi$ is the scattering coefficient for the given angle of scattering (cm.$^2$/electron/steradian). This scattering coefficient $\phi$ is determined by the probability of scattering for the particular geometry involved and can be ascertained mathematically by using the well-known Klein Nishina formula. This probability of scattering for the given geometry involved is material-sensitive, geometry-sensitive and incident-energy-sensitive. FIG. 7 portrays graphically the relative scattering intensities for various geometry situations (i.e., various scattering angle and plate angle combinations), the material and incident energy parameters being kept constant. Viewing the graphic results of this FIG. 7, it can be seen that there are a number of possibilities of scattering angle-plate angle combinations which will yield maximal relative scattered intensities of about the same level. In establishing a "best scattering geometry" for a backscatter flaw detection system, such as defined herein, one of these scattering angle-plate angle combinations which produce "maximal" relative scattered intensity will be adopted.

The collimated incident radiation beam, the material test specimen and the backscattered-photon-sensing detector herein are arranged to satisfy the dictates of one of the "optimal" scattering angle-plate angle combinations (as defined by the FIG. 7 graph, for example) wherein a "maximal" "relative scattered intensity" will be achieved. By then applying the principle embodied in the Compton equation (Equation 1 supra) the photon-detection portion of the system apparatus can be designed to discriminate in favor of backscattered photons of a specific preselected energy level(s). Because of the known relationship between the energy level of the incident radiation, the energy level of the scattered radiation and the angle of scattering ($\theta$) as established by the Compton equation (Equation 1 supra) the selective reception of the "favored" (energy-level) backscattered photons coupled with a knowledge of the energy level of the specimen-incident radiation and the use of a preset scattering angle-plate angle combination as discussed above, the origin of the "favored" backscattered photons within the material specimen can be established, so that the location of a flaw indicated by the favored backscattered photons can be fixed in the material specimen. This is what is entailed in the use of the so-called "best scattering geometry" which in its broadest sense incorporates the principles embodied in both Equations 1 and 2 above.

Figure 1:
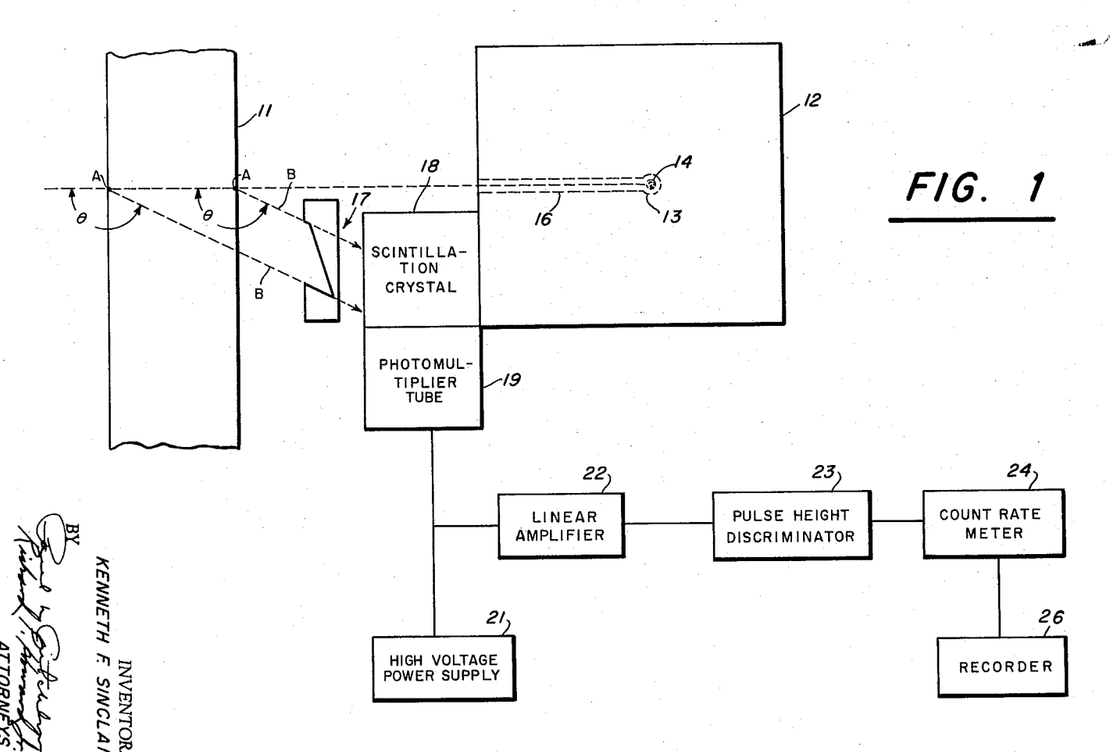
FIG. 1 portrays one embodiment of the flaw detection system of the invention—employing one type of "depth compensator"

Looking now to the structure defined herein, FIG. portrays one embodiment of the backscatter flaw detection system of the invention.

A material test object 11 is supported in a conventional manner for examination travel under the flaw detecting apparatus of the invention and, in actual testing procedure, may be advanced through the flaw testing zone in a continuous or stepped motion, as desired.

Mounted in a conventional manner for a selected operative fixed position is a thick shield 12, of lead or some like dense material, in whose central recess 13 there is located a radiation source 14 which preferably, though not necessarily, emits monochromatic radiation. The energy level of the monochromatic radiation must be known and, in an instance where a spectrally-distributed radiation source is employed, it is essential to know its uppermost spectral level of energy. Shield 12 is formed with a relatively long collimating passageway 16 therein which leads to the central recess 13. This shield 12 will strongly absorb all radiations emitted by radiation source 14 except those which pass from central recess 13 by way of collimating passageway 16. This passageway 16 acts to collimate the emitting radiation from radiation source 14 into a "pencil" beam of radiation which will be incident upon the material test object 11. Although other "plate angles" may be selected, for the embodiments defined herein a "plate angle" of "zero" degree has been selected for the "best scattering geometry" employed and, accordingly, shield 12 is positioned with respect to the material test object 11 so that the radiation "pencil" beam emitting from collimating passageway 16 strikes the radiation-entry surface of material test object 11 with the entering radiation beam normal to this surface. The flaw detection apparatus is intended to detect the presence of a flaw which at the given test moment is located somewhere along the line A—A which lies along the extended path of the entering radiation beam. The apparatus, as described herein, is not intended to locate where a detected flaw is along this line A—A, but solely to detect any flaw(s) which may be anywhere along this line A—A at the given moment of test examination.

Located on the same side of the material test object 11 as the radition source 14 is a selectively-discriminating backscattered photon detection-and-recording apparatus which comprises in combination a "wedgelike" depth compensator 17, a scintillation crystal 18, a photomultiplier tube 19 (operatively associated with scintillation crystal 18), a high voltage power supply 21, and the series combination of a linear amplifier 22, a pulse height discriminator 23, a count rate meter 24 and a recorder 26 (see FIG. 1 of the drawing).

The discussion here will temporarily omit consideration of and discussion about the "wedgelike" depth compensator 71 which will be taken up at a later point herein.

Scintillation crystal 18, which is comprised of any conventional scintillant material such as anthracene or sodium iodide or any like substance adapted to efficiently produce light as an incident of interaction between the scintillant material and radiation photons incident thereupon, is positioned in a certain fixed position with respect to material test object 11 and the pencil radiation beam normal to material test object 11. This scintillation crystal is positioned with respect to material test object 11 and the incident radiation beam thereupon to satisfy the dictates of a "best scattering geometry" (discussed in general terms supra) in order to operate the system to deal with as high an intensity as possible of the backscattered "photons-of-interest" (and thereby achieve a high degree of sensitivity and resolution in the system). Looking now to FIG. 7 it can be seen that, with the "plate angle" (here "zero" degrees) determined by the incidence angle of the incident radiation, an optimal "scattering angle" can be determined which will yield a "maximum relative scattered intensity" by the singly-scattered backscattered "photons-of-interest." The photon-receiving portion of scintillation crystal 18 will be positioned to satisfy the "optimum" scattering angle selection which yields a maximum relative scattered intensity of these backscattered photons. With the photon-receiving portion of scintillation crystal 18 oriented to establish the proper (selected) scattering angle $\theta$ (as just described), singly-scattered backscattered photons originating from along the line-of-examination A—A in material test object 11 will arrive at the operative photon-registering portion of scintillation crystal 18 at a substantially constant energy level (as determined by the Compton scattering equation (Equation 1), explained supra). These are the so-called "photons-of-interest" mentioned earlier. These backscattered "photons-of-interest" will arrive at scintillation crystal 18 in what may be looked upon as a substantially parallel-moving group of photons, a group whose outer limits are defined by the lines B, B in FIG. 1. Photons received by scintillation crystal 18 are converted thereby into light impulses whose individual intensities are proportional to the energy levels of the light-creating impinging photons.

Photomultiplier tube 19, which is a conventional photomultiplier tube in operative combination with scintillation crystal 18, acts to receive and transform the light impulses produced in scintillation crystal 18 (by the crystal-impinging photons) into electrical pulses whose individual amplitudes are proportional to the individual intensities of the light impulses from which they are derived. Thus the signal pulses which are produced by photomultiplier tube 19 will individually represent the energy levels of the scintillation-crystal-registered photons from which these signal pulses are eventually derived.

Linear amplifier 22, which is connected to the output of photomultiplier tube 19, receives the electrical pulses from photomultiplier tube 19 and amplifies them in a linear fashion, preserving the relative amplitude pattern of the electrical signal pulse output from photomultiplier tube 19.

From the output of linear amplifier 22 the now-amplified signal pulses, derived from the operative combination of scintillation crystal 18 and photomultiplier tube 19, are fed to pulse height discriminator 23 which consists of a conventional signal-amplitude-discriminating network which in "filter-like" fashion will transmit only those signal pulses which fall along a certain predetermined energy level. This pulse height discriminator 23 is designed to pass only those signals whose amplitudes correspond to the energy level of singly scattered, backscattered photons which originate along the line-of-examination A—A and which are at the energy level (per the Compton equation, (Equation 1)) determined by the selected scattering angle $\theta$ which obeys the dictates of the selected "best scattering geometry." It can be appreciated that scintillation crystal 18 will register backscattered photons which do not qualify as the flaw-information-bearing backscattered "photons-of-interest," and, since it responds to all actuating photons incident thereupon, a number of "unwanted" light impulses and electrical signal pulses derivative therefrom will be introduced into the output of linear amplifier 22. Pulse height discriminator 23 affords a means of "weeding out" these unwanted photon responses, for by precluding passage of signal pulses of all amplitudes, but the amplitude which the singly-scattered backscattered "photons-of-interest" will produce, the system can be considered as dealing only with the singly-scattered backscattered photons-of-interest which bear the intelligence which will indicate a flaw presence along the line-of-examination A—A.

The "qualifying" electrical pulses are passed from pulse height discriminator 23 to a conventional count rate meter 24 where the incoming pulse rate is averaged and then passed on to a conventional recorder 26 where this averaged count rate is portrayed graphically.

High voltage power supply 21 is present, as shown, to furnish the necessary power supply to the aforementioned apparatus.

Variations in the recorded count rate not attributable to known causes are indicative of anomalies, i.e., flaws, in the material object under test.

Returning now to a consideration of the "wedgelike" depth compensator 17, it is present to meet a problem inherently present in any technique employing backscattered photons to detect material flaws. In the backscatter process both the "primary" (i.e., incident radiation photons) and the resulting "scattered" photons are attenuated exponentially as a function of depth in the material (under test), while the scattering coefficient at any point in the material under test remains constant for fixed geometry, with the result that the sensitivity of a flaw detecting method employing "backscattering" deteriorates markedly with increase in depth within the material of the "point-of-interest" (i.e., "point-of-examination"). The purpose of the "wedgelike" depth compensator 17 is to correct for this inherent variation in sensitivity of a "backscatter system" as a function of depth in the material test object. Depth compensator 17 in its operative photon-passing portion is a simple "wedge" of dense material, usually lead, which is placed between the (photon-detecting) scintillation crystal 18 and the material test object 11 as seen in FIG. 1. As noted previously, the singly-scattered backscattered photons originating along the line-of-examination A—A in the material test object 11 emerge from the material test object 11 as an approximate parallel beam whose limits are defined by the lines B, B in FIG. 1.

The simple "wedge" (represented by portion 27) of depth compensator 17 acts upon the radiation beam formed by the backscattered "photons-of-interest" to absorptively attenuate the various individual backscattered "photons-of-interest" in a varying manner which depends on the (examination) depth within the material test object 11 (as measured from the radiation-incident surface of material test object 11) of the point of origin (along the line-of-examination A—A) of the particular individual "photon-of-interest." It will be noted from viewing the depth compensator 17 of FIG. 1 (and the comparable depth compensators of the other later-defined embodiments of the invention) that those "photons-of-interest" originating at the greatest examination-depth within material test object 11 traverse the least thickness of the (absorbing) portion 27 of depth compensator 17 and that those "photons-of-interest" originating at the least examination-depth traverse the greatest thickness of the (absorbing) portion 27. With each of the "photons-of-interest," which originate somewhere along the examination line A—A, traveling a path which maintains a constant angle with respect to the line A—A, as determined by the angle of scattering ($\theta$) dictated by the preselected "best scattering geometry" of the system, the photon-passing radiation-absorbing portion 27 of depth compensator 17 acts upon each individual "photon-of-interest" in the intercepted photon beam in such a manner that the sum total of (1) the absorption encountered by the individual backscattered "photon-of-interest" in the material test object 11 and in the depth compensator 17 and of (2) the absorption suffered in the material test object 11 by the "primary" (incident-radiation) photon from which the given individual backscattered "photon-of-interest" is derived is sensibly constant for all of the "photons-of-interest."

Figure 2:
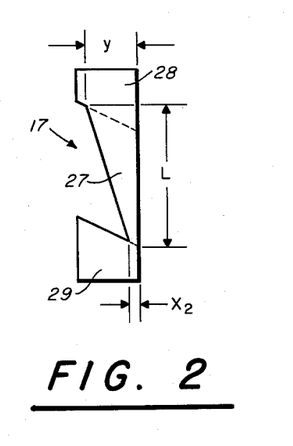
FIG. 2 is an enlarged front-view showing of the depth compensator utilized in the FIG. 1 embodiment.
Figure 3:
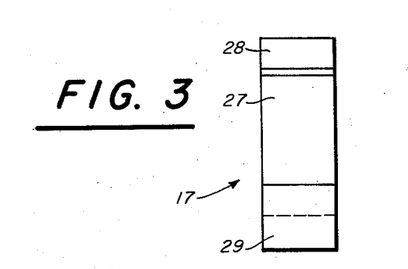
FIG. 3 is a plan view of the FIG. 1 "depth compensator"

Looking now to FIGS. 2 and 3 which show the "wedgelike" depth compensator 17 in enlarged view, it can be seen that the actual depth compensator 17 is composed of three principal portions. Portion 27 is the operative wedge-shaped photon-passing portion of the entire depth compensator 17 structure and whose operative function has just been discussed above. The adjacent end portions 28 and 29, respectively (set off in FIG. 2 by dotted lines to separate them from the photon-passing portion 27), which it will be noted are substantially bulky, merely serve as "shielding" sections. These bulky end portions 28 and 29 are sufficient in size for each to present theoretically (for the purpose at hand) an infinite thickness of material to any "stray" radiation outside of the "parallel" photo beam whose outer limits are defined by the lines B, B. The dimension "L" shown in FIG. 2 will be determined by the maximum depth of the material test object 11 which, in turn, determines the size (i.e., breadth) of the beam of backscattered "photons-of-interest" which the operative photon-passing portion 27 of depth compensator 17 must accommodate. Dimension "$X_2$" of FIG. 2 is the thinnest practicable thickness with which the operative photon-passing portion 27 can be made. With thickness "$X_2$" once determined, thickness Y of the photon-passing portion 27 can then be computed. The required thickness of the photon-passing wedge-shaped photon-passing portion 27 at each end can be computed by the use of the following expression:

$$I=I_0e^{-(\mu x+\mu_1 x_1+\mu_2 x_2)} \quad \text{(Equation 3)}$$

where $I_0$=incident radiation intensity; $e$=the natural logarithm base; $\mu$= the absorption coefficient in the test material (i.e., material test object 11) for the incident radiation; $\mu_1$=the absorption coefficient in the test material for the scattered radiation; $\mu_2$=the absorption coefficient on the "wedgelike" depth compensator 17 (i.e., photo-passing portion 27) for the scattered radiation; $x$=the distance in the test material to the "point of interest" (measured along the line of incident radiation); $x_1$=the distance from the "point of interest" to the exterior face (photon exit surface) of the test material (measured along the line traversed by the backscattered photon-of-interest); $x_2$, as shown in the above equation represents, in each given instance, the particular operative thickness dimension (involved) of the wedge-shaped photon passing portion 27. As noted in the description just below, $x_2$, in one computation using this equation, represents the wedge-shaped photon-passing portion 27 thickness at the point of thinnest practical thickness and, in another computation, the point of maximum operative thickness of portion 27 (i.e., alternately, the thickness dimension at the two ends of the wedge-shaped portion 27). This is to be distinguished from the showing in FIG. 2 which shows, for purposes of illustration, $x_2$ as the thinnest-end thickness and Y as the thickest-end thickness for the wedge-shaped photon-passing portion 27.

The initial computation is made for the maximum depth of interest in the material test object 11. That is, the relative backscatter intensity, I, is computed for the maximum penetration $x$, as desired (measuring down from the radiation-incident surface of the test object). In this computation the thinnest practical wedge thickness $x_2$ is used. A second computation is then performed using the previously-computed I for the surface of the test object with $x_2$ unknown. A computed value of $x_2$ then determines the wedge thickness at the two ends. A simple wedge-shaped operative photon-passing portion 27 of the depth compensator 17 is then defined, since the length L is known and the respective thicknesses at the two ends are known. The probability of scattering through the angle defined by the geometry selected and in the test material of interest (cf. Equation 2 supra) has been omitted from the above-noted expression (Equation 3) since it remains the same for the primary photons at all depths in the material test object. Consequently, it is sufficient, for the purposes here, to use only the expression above (Equation 3) and to normalize the relative intensity I at the photon-detecting scintillation crystal 18 for all positions in the material test object 11. (It will be noted that FIG. 7, in effect, portrays relative scattered intensity in terms of "best scattering geometry" where there is "zero" "wedgelike" depth-compensator 17 thickness involved.)

Figure 4:
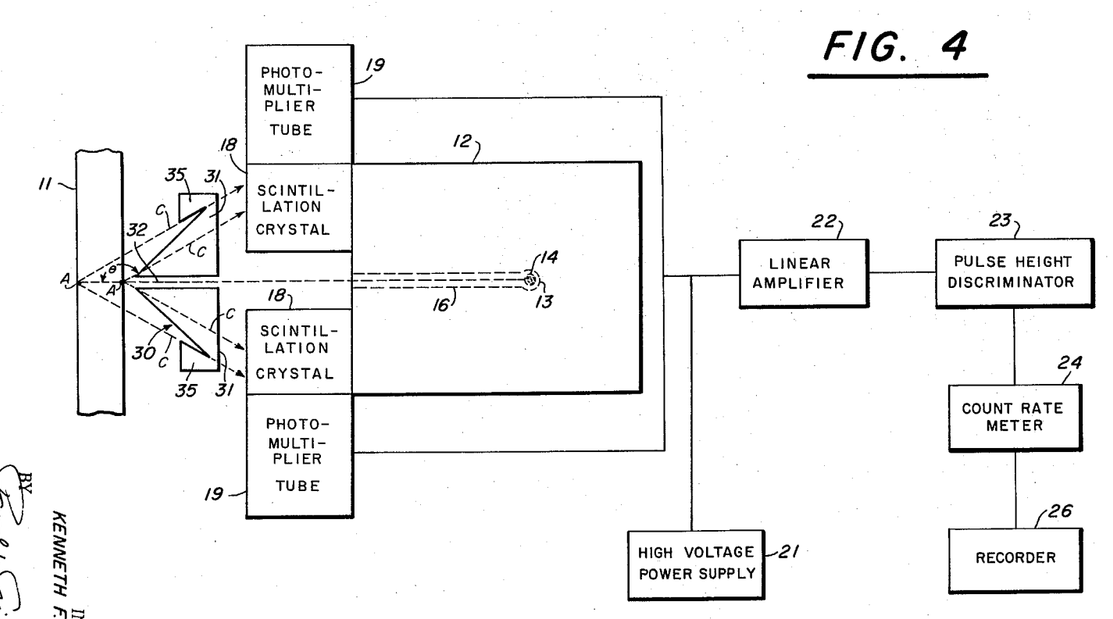
FIG. 4 portrays a flaw detection system embodiment similar to the FIG. 1 embodiment, but employing a second type of "depth compensator"
Figure 5:
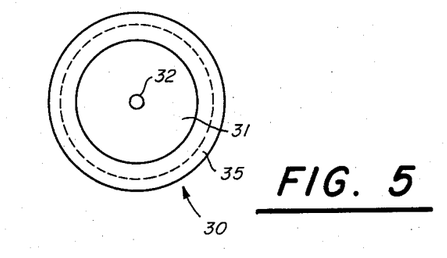
FIG. 5 is a plan view of the "depth compensator" utilized in the FIG. 4 embodiment.

FIG. 4 portrays a second embodiment of the present invention which differs from the FIG. 1 embodiment primarily in the type of depth compensator it employs. Here, instead of the wedgelike depth compensator 17 of the FIG. 1 embodiment, a centrally-apertured depth compensator 30 is employed which has a substantially conically-shaped photon-passing portion 31 and an annularly-extending shielding portion 35 peripherally disposed about the photon-passing portion 31. Looked at in the plan view (FIG. 5) the operative photon-passing portion 31 of this depth compensator 30 can be seen to have a substantially circular configuration. The centrally-disposed aperture 32 of this depth compensator 31 is disposed as shown in FIG. 4 so that the incident radiation beam from radiation source 14 can pass through this aperture 32 in the depth compensator 30 to strike the material test object 11 as shown. Since all of the photons backscattered from any point-of-interest along the line A—A in the material test object 11 can be pictured as emerging from that point-of-interest on the surface of a cone whose axis is the incident radiation beam (also line A—A here) and whose apex is the point-of-interest in the material test object 11, it can be seen that use of such a centrally-apertured depth compensator 30 as seen in FIG. 4 with its conical-like photon-passing portion 31 will provide even greater sensitivity in the system than is present in the FIG. 1 embodiment. It is, however, to be noted that the FIG. 4 embodiment employs multiple scintillation crystals 18 and associated photomultiplier tubes 19 because of the requirements of the new geometry associated with the use of the centrally-apertured depth compensator 30 with its conical-like photon-passing portion 31. The peripherally-disposed shielding portion 35 of this depth compensator 30 acts to shield off "spurious" or "unwanted" backscattered photons from the scintillation crystals 18. Except for the differences noted, the FIG. 4 embodiment is predicated upon the same principles as set forth supra and functions in the same manner as the FIG. 1 embodiment.

Figure 6:
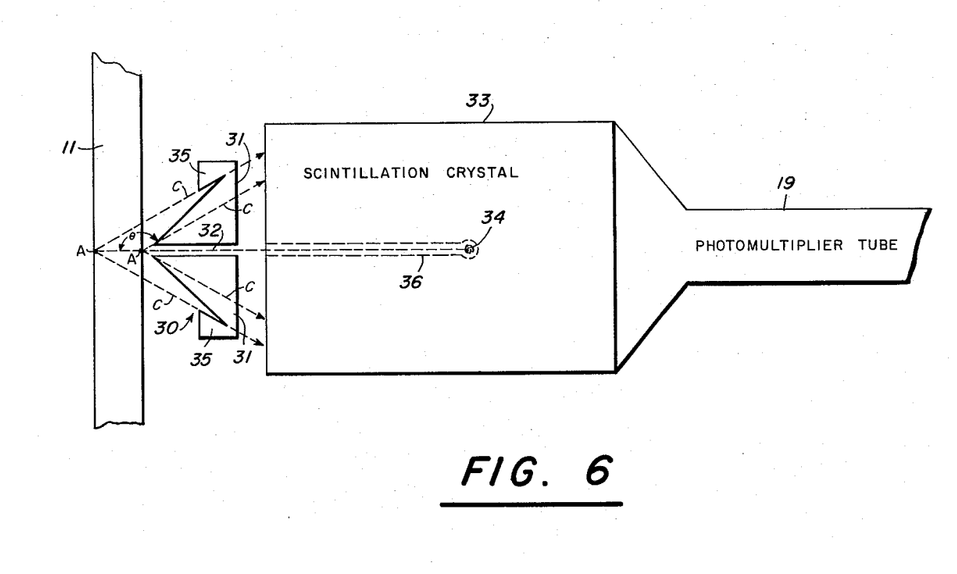
FIG. 6 portrays still another and, in some ways, a preferred embodiment of the flaw-detection system of the invention.

FIG. 6 portrays still another embodiment and, in many ways, a preferred embodiment of the invention. It is, in effect, a logical extension of the FIG. 4 embodiment which employs the centrally-apertured depth compensator 30. In this FIG. 6 embodiment once again the centrally-apertured depth compensator 30 with its conical-like photon passing portion 31 is employed as shown. However, as opposed to the previous FIG. 4 embodiment, here a thicker-than-usual scintillation crystal 33 is employed in which there is imbedded the radiation source 34 which is to serve as the source of the incident radiation for the material test object 11. This scintillation crystal 33 is formed with a collimating passageway 36 therein which is in line with the centrally-disposed aperture 32 of depth compensator 30 so that the pencil beam of incident radiation can pass from radiation source 34 via passageway 36 and aperture 32 to strike the near surface of material test object 11 normal thereto. The pertinent flaw-information-bearing backscattered photons will take the form of a conical-like beam whose limits are variously defined in FIG. 6 by the lines C, C, C, C and which will have the configuration of a "figure of revolution" whose axis lies along the line A—A. It can be seen readily that here again, by using the circular-configuration (plan view) depth compensator 30 a "360° backscattered photon emission coverage" can be utilized to give the flaw detection system a maximum sensitivity capacity. The balance of the system (generally not shown) includes a photomultiplier tube, a linear amplifier, pulse height discriminator, count rate meter, recorder, and a high voltage power supply as set forth for the FIG. 1 embodiment. With the specific exceptions noted herein this FIG. 6 embodiment is predicated upon the same principles as and functions in the same manner as the FIG. 1 embodiment. The practicality of this particular approach embodied in the FIG. 6 embodiment is determined by the test sensitivity required and the speed of the associated electronic components of the system. It can readily be seen here that the problem to be avoided with the scintillation crystal and depth compensator combination of FIG. 6 embodiment is the introduction, into the scintillation crystal detection results, of "unwanted" responses induced in the scintillation crystal 33 by "primary" photons originated by the imbedded radiation source 34 and acting immediately upon the scintillant material. Radiation source 34 must be "planted" deeply enough inside scintillation crystal 33 to ensure good collimation of the radiation beam which is to be incident upon material test object 11 and to ensure that most of the photons not going down collimating passageway 36 are essentially totally degraded, the latter objective being sought with the view of getting light pulses in the scintillant material from the action of "primary" photons which are significantly different from backscatter-photon-derived light pulses. With scintillation crystal 33 large enough and radiation source 34 implanted therein in a deep enough position, most photons produced directly (in crystal 33) by radiation source 34 will be totally degraded in the crystal 33 in a very short time interval resulting in pulse heights proportional to the primary photon energy and a fast pulse height discriminator can be used to screen out these particular pulses, thereby providing the effective shielding needed for the method employed in this FIG. 6 embodiment. The ("wanted") scattered photons, on the other hand, arriving at scintillation crystal 33 through the depth compensator 30 are at a much lower energy and can be counted selectively. The method embraced in the FIG. 6 embodiment results in minimum shield weight and optimum sensitivity. In the FIG. 1 embodiment "shielding" was used to get rid of unwanted photons; in this FIG. 6 embodiment pulse height discrimination alone is the significant technique employed for getitng rid of unwanted photons. Both the pulse height discriminator and the linear amplifier of this FIG. 6 embodiment must have suitably fast-enough resolving time characteristics for this purpose.

Obviously many modifications and variations of the present invention are possible in the light of the above teachings. It is intended to cover all changes and modifications of the embodiments set forth herein which do not constitute departures from the spirit and scope of the invention.

What is claimed is:

1. Detection apparatus, for the detection of flaws in a material specimen and involving a non-destructive testing technique requiring access to only one side of the material specimen under test, which comprises:

irradiating means, adapted to be operatively located in proximity to said material specimen, for subjecting a selected localized thickness zone in said material specimen to incident radiation of known energy level;

detecting-and-converting means, adapted to be operatively located on the same side of said material specimen as said irradiating means, for selectively detecting an emergent essentially parallel beam of singly-scattered back-scattered photons of a predetermined energy level resulting from Compton interactions induced in the selected localized thickness zone of said material specimen by said material-specimen-incident radiation and for converting the selectively-detected backscattered photons to corresponding electrical pulses, said detecting and converting means including a scintillation crystal having an operative surface area at least as wide as said beam;

counting means, operatively connected to the output of said detecting-and-converting means, for counting per unit time the total number of photon-derived electrical pulses produced by said detecting-and-converting means in response to the selectively-detected backscattered photons, a change in the count rate of said photon-derived electrical pulses which is not attributable to known changes in said material specimen being indicative of flaw presence in the selected localized zone of said material specimen; and depth compensating means, adapted to be operatively located in the path of the aforementioned singly-scattered backscattered photons originating in said selected localized thickness zone and of the predetermined energy level and compensatingly absorptively attenuating said singly-scattered backscattered photons originating in said localized zone and of the predetermined energy level before they are detected by said detecting-and-converting means, in such a fashion that the respective individual photons of said singly-scattered backscattered photons originated in said selected localized zone and of the predetermined energy level, and hereinafter referred to as the photons-of-interest, are subjected by said intercepting depth compensating means to an amount of absorptive attenuation which varies inversely with the depth within said material specimen, as measured from the radiation-incident side of said material specimen, of the point of origin of the given photon-of-interest in a predetermined manner to nullify an otherwise-present variation in test sensitivity of said detection apparatus as a function of said depth within said material specimen, this otherwise-present test sensitivity variation being characterized by a loss in test sensitivity as a direct function of the aforementioned depth within said material specimen of the given point-under-consideration which in this context is synonymous with the point of origin of the individual photon-of-interest involved said depth compensating means comprising:

a wedge-shaped photon-passing radiation-attenuating member of a length to lie athwart the path of the radiation beam defined by the various photons-of-interest and in intercepting position with respect to said beam formed by said photons-of-interest, the thinnest portion of said wedge-shaped member being adapted to lie in the path of those photons-of-interest which originate at the point of greatest examination depth within said material specimen, as measured from the radiation-incident surface of said material specimen, and the thickest portion of said wedge-shaped member being adapted to lie in the path of those photons-of-interest which originate at the point of minimum examination depth within said material specimen, as likewise measured from the radiation-incident surface of said material specimen.

2. The apparatus of claim 1 wherein said depth compensating means is further characterized by a first shielding means, disposed contiguous to the thickest portion of said wedge-shaped member, and a second shielding means disposed contiguous to the thinnest portion of said wedge-shaped member, said first shielding means and said second shielding means being present for the function of offering operatively substantially infinite impedance to the passage of backscattered photons therethrough so that said first and said second shielding means act to prevent backscattered photons which are induced in said material specimen by said incident radiation and which do not qualify as photons-of-interest from passing to and being registered by said detecting-and-converting means.

3. The apparatus of claim 1 wherein the collimated radiation beam from said irradiating means is directed perpendicular to the radiation-incident surface of said material specimen and wherein said depth compensating means comprises:

a substantially-conically-shaped photon-passing radiation-attenuating member having a centrally-disposed aperture running from the vertex to the base of said substantially-conically-shaped member, said substantially-conically-shaped radiation-attenuating member being positioned with its base parallel to the radiation-incident surface of said material specimen and with its centrally-disposed aperture in line with the unidirectionally-incident collimated beam of radiation produced by said irradiating means for the purpose of allowing unhindered passage of said incident collimated radiation beam from said irradiating means to said material specimen;

said substantially-concically-shaped radiation-attenuating member being of a radial length to lie athwart and in intercepting position with respect to the path of the radiation beam formed by the photons-of-interest which form a radiation beam having the configuration of a figure-of-revolution about an axis which is collinear with the axis of said substantially-conically-shaped radiation-attenuating member, the slant height length of said radiation attenuating member being such that the thinnest breadth of said substantially-conically-shaped radiation-attenuating member is disposed in the path of those photons-of-interest which originate at the point of greatest examination depth in said material specimen, as measured from the radiation-incident surface of said material specimen, and such that the thickest breadth of said substantially-conically-shaped radiation-attenuating member is disposed in the path of those photons-of-interest which originate at the point of minimum examination depth within said material specimen, as likewise measured from the radiation-incident surface of said material specimen.

4. The apparatus of claim 3 wherein said depth compensating means further comprises a shielding means, disposed contiguous to that portion of thinnest breadth of said substantially-conically-shaped radiation-attenuating member, for presenting operatively substantially infinite impedance to the passage of backscattered photons therethrough so as to prevent backscattered photons which are induced in said material specimen by said incident radiation and which do not qualify as photons-of-interest from passing to and being registered by said detecting-and-converting means.

5. Detection apparatus, for the detection of flaws in a material specimen and involving a non-destructive testing technique requiring access to only one side of the material specimen under test, which comprises:

a scintillant-material crystal adapted to be operatively located near an accessible side of said material specimen, said crystal being formed with a central recess therein which is adapted to accommodate a radiation source therein and being further formed with a radiation-collimating passageway therein which leads from said central recess to the outside of said crystal and which has a longitudinally-extending axis whose direction is substantially perpendicular to the surface of the accessible side of said material specimen when said crystal is in operative position with respect to said material specimen;

a radiation source of known energy level located in the central recess of said scintillant-material crystal for transmitting radiation via the collimating passageway in said crystal, the transmitted radiation being collimated by the collimating passageway in said crystal to issue from said crystal as a unidirectionally-incident beam of radiation which strikes the radiation-incident surface of said material specimen substantially perpendicularly to said surface to subject a selected localized zone in said material specimen to the incident radiation;

said scintillant-material crystal being in such operative position with respect to said material specimen as to receive singly-scattered backscattered photons which result from Compton interactions induced in said selected localized zone and which are of a predetermined fixed energy level and which present to said crystal a maximum relative scattered intensity, said scintillant-material crystal being reactive to photons received thereby to convert received photons into light pulses whose individual intensities correspond to the energy levels of the individual photons from which these light pulses are derived;

photomultiplier means, in mated operative position with respect to said scintillant-material crystal, for receiving and converting the photon-derived light pulses of said scintillant-material crystal into corresponding electrical pulses whose individual amplitudes correspond to the individual intensities of the light pulses from which they are derived;

pulse height discriminating means, operatively connected to the output of said photomultiplier means, for allowing the passage therethrough only of electrical pulses having amplitudes corresponding only to the energy level of the aforementioned singly-scattered backscattered photons which originate in said selected localized zone and are of said predetermined fixed energy level and which present a maximum relative scattered intensity to said crystal;

counting means, connected to the output of said pulse height discriminating means, for counting per unit time the total number of the photon-derived discrimination-favored electrical pulses passed by said pulse height discriminating means, a change in the count rate of said photon-derived electrical pulses which is not attributable to known changes in said material specimen being indicative of flaw presence in the selected localized zone of said material specimen; and depth compensating means, adapted to be operatively located in the path of the aforementioned singly-scattered photons originating in said selected localized zone and of the predetermined energy level and which present a maximum relative backscattered singly-scattered photon intensity, for compensatingly absorptively attenuating said singly-scattered backscattered photons originating in said localized zone and of the predetermined energy level and which present a maximum relative backscattered singly-scattered photon intensity, before they impinge upon said scintillant-material crystal, in such a fashion that the respective individual photons, of said singly-scattered backscattered photons originated in said selected localized zone and of the predetermined energy level and which present a maximum relative backscattered singly-scattered photon intensity, and hereinafter referred to as the photons-of-interest, are subjected by said intercepting depth compensating means to an amount of absorptive attenuation which varies inversely with the depth within said material specimen, as measured from the radiation-incident side of said material specimen, of the point of origin of the given photon-of-interest in a predetermined manner to nullify an otherwise-present variation in test sensitivity of said detection apparatus as a function of said depth within said material specimen, this otherwise-present test sensitivity variation being characterized by a loss in test sensitivity as a direct function of the aforementioned depth within said material specimen of the given point-under-consideration, which, in this context, is synonymous with the point of origin of the individual photon-of-interest involved;

the overall size of said scintillant-material crystal being sufficient and said radiation source being deeply enough imbedded in said crystal as to ensure that primary photons which do not pass from said radiation source by way of said collimating passageway are essentially totaly degraded within said scintillant-material crystal.

References Cited by the Examiner

UNITED STATES PATENTS

| | | | |
|---|---|---|---|
| 2,467,812 | 4/1949 | Clapp | 250—83.4 |
| 2,997,586 | 8/1961 | Scherbatskoy | 250—83.4 X |
| 3,056,027 | 9/1962 | Martinelli | 250—83.4 |

RALPH G. NILSON, *Primary Examiner.*

ARCHIE R. BORCHELT, *Examiner.*